Oct. 1, 1946.  R. T. PAYNE  2,408,477
POULTRY FEEDER
Filed Feb. 9, 1945  2 Sheets-Sheet 1

Inventor
R. T. Payne
By Munn, Liddy & Glaceum
Attorneys

Oct. 1, 1946.  R. T. PAYNE  2,408,477
POULTRY FEEDER
Filed Feb. 9, 1945  2 Sheets-Sheet 2

Inventor
R. T. Payne

Patented Oct. 1, 1946

2,408,477

UNITED STATES PATENT OFFICE 2,408,477

POULTRY FEEDER

Robert T. Payne, Upland, Calif.

Application February 9, 1945, Serial No. 577,017

8 Claims. (Cl. 119—54)

This invention relates to poultry feeders.

An object of the invention is the provision of a poultry feeder which may be placed indoors or outdoors, and in which a hopper is provided having a narrow slot placed above a feeding trough with means projecting through the narrow slot and adapted to be agitated when the poultry is feeding for causing the feed to be discharged from the slot in the event that the feed tends to clog around the slot.

Another object of the invention is the provisions of a poultry feeder in which is included a hopper having a narrow slot at its lower end, with the slot being spaced above a trough with screens placed over the trough and having feed openings through which a chicken is required to insert its head to obtain the food, in so doing said screen being agitated for agitating resilient supporting members of the screen, said resilient supporting members extending through a narrow slot and agitating the feed in the bin and causing the feed to be discharged from said narrow slot.

A further object of the invention is the provision of a poultry feeder having a vertically disposed hopper with an elongated narrow slot at its lower end spaced above a feeding trough, the lower end of the hopper being located centrally of the trough so that chickens may feed at opposite sides of the hopper, a screen being placed over the exposed portion of the trough to prevent the poultry from entering said trough, resilient wires having U-shaped portions located in the narrow slot for supporting the screens above the feed in the trough, said screens and the U-shaped portions of the resilient supporting means being agitated during feeding so that the feed in the trough adjacent the opening will be agitated for causing the feed to pass through the opening into the trough.

This invention will be best understood from a consideration of the following detailed description, in view of the accompanying drawings forming a part of the specification; nevertheless, it is to be understood that the invention is not confined to the disclosure, being susceptible to changes and modifications as define no material departure from the salient features of the invention as expressed in the appended claims.

Figure 1:
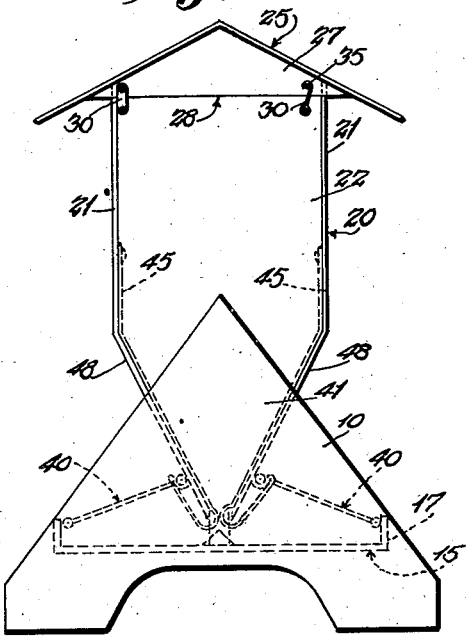
Fig. 1 is an end view in elevation of a poultry feeder constructed according to the principles of my invention.

Referring more particularly to the drawings, 10 and 11 represent end supports. These supports are triangularly shaped and are cut away as shown at 12 to provide a pair of feet 13.

A feeding trough generally designated by the numeral 15 has a bottom 16 secured at its ends to the end walls 10 and 11. Side walls 17 are secured to the bottom 16 along the longitudinal side edges and rise a short distance above the bottom to maintain the feed on said bottom. A triangularly shaped division bar 18 is secured centrally of the trough for a purpose which will be presently explained.

A hopper 20 has side walls 21 which are identical in construction and end walls 22 which are likewise of the same configuration. The lower portions of these side walls 21 are turned inwardly and terminate above the upper edge of the division bar 18 to provide a narrow elongated slot, generally designated by the numeral 23 through which feed is adapted to be discharged into the trough 15 and upon the triangularly shaped bar 18 so that the feed will fall to the bottom sections of the trough at each side of the elongated slot 23. The end walls 22 of the hopper 20 are secured in any approved manner to the end supports 10 and 11.

A roof generally designated by the numeral 25 is mounted on the top of the hopper 20. The roof is formed of gables with eaves 26 extending sufficiently beyond the confines of the side walls 21 so that they will project over the side edges of the trough 15 and prevent water or snow from entering the trough. Triangularly shaped end walls 27 are secured to the gabled roof 25 and the lower edges 28 of these end walls of the roof rest upon the upper edges of the end walls 22 of the hopper.

Figure 2:
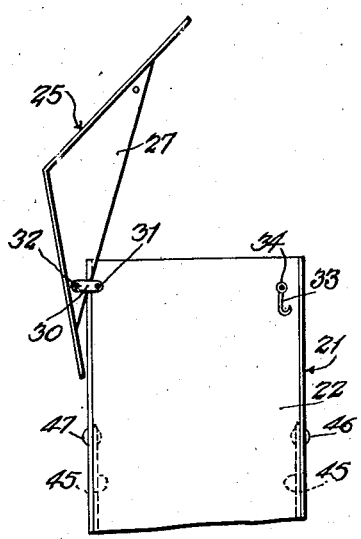
Fig. 2 is a fragmentary side view showing the roof of the hopper of the feeder in open position.
Figure 3:
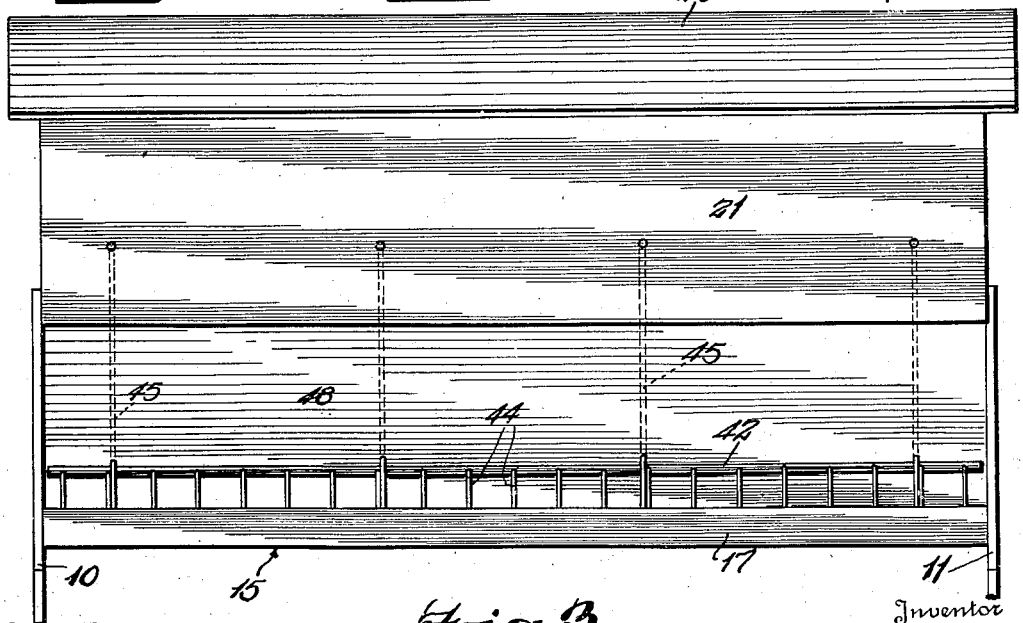
Fig. 3 is a side view of the poultry feeder.

It will be noted from Fig. 1 that the side walls 21 extend above the upper edge of the end walls so that the two sections of the roof will rest on the upper edges of said side walls. As shown more particularly in Fig. 4, it will be seen that the upper ends of the side walls 21 are sheared off at an angle to conform to the angular disposition of the sections of the roof 25. Thus, the roof, when it is in place, completely encloses the top of the hopper 20. The roof 25 is supported by strap hinges 30. One end of each strap hinge at each end of the hopper is pivotally connected at 31 on an end wall 22 of the hopper. The other end of the strap is pivotally connected at 32 with the end walls 27 of the roof 25. By this construction the roof may be moved to an open position as shown in Fig. 2 from the position illustrated in Fig. 1. A latch 33 is pivotally mounted at 34 at one or both of the end walls 22 and this latch is adapted to engage an eye 35 projecting from an end wall 27 of the roof 25 for maintaining the roof in closed position until it is desired to open the same to supply feed to the hopper 21.

A screen generally designated by the numeral 40 is applied to each side of the lower reduced portion 41 of the hopper 20 and above the exposed portions of the feeding trough 15. Each screen is formed of a pair of parallel rods 42 and 43 connected together with transverse rods 44. The rods 44 are spaced a sufficient distance apart so that poultry may obtain the feed from the trough 15, although the screens will prevent the poultry from standing in the trough.

Figure 4:
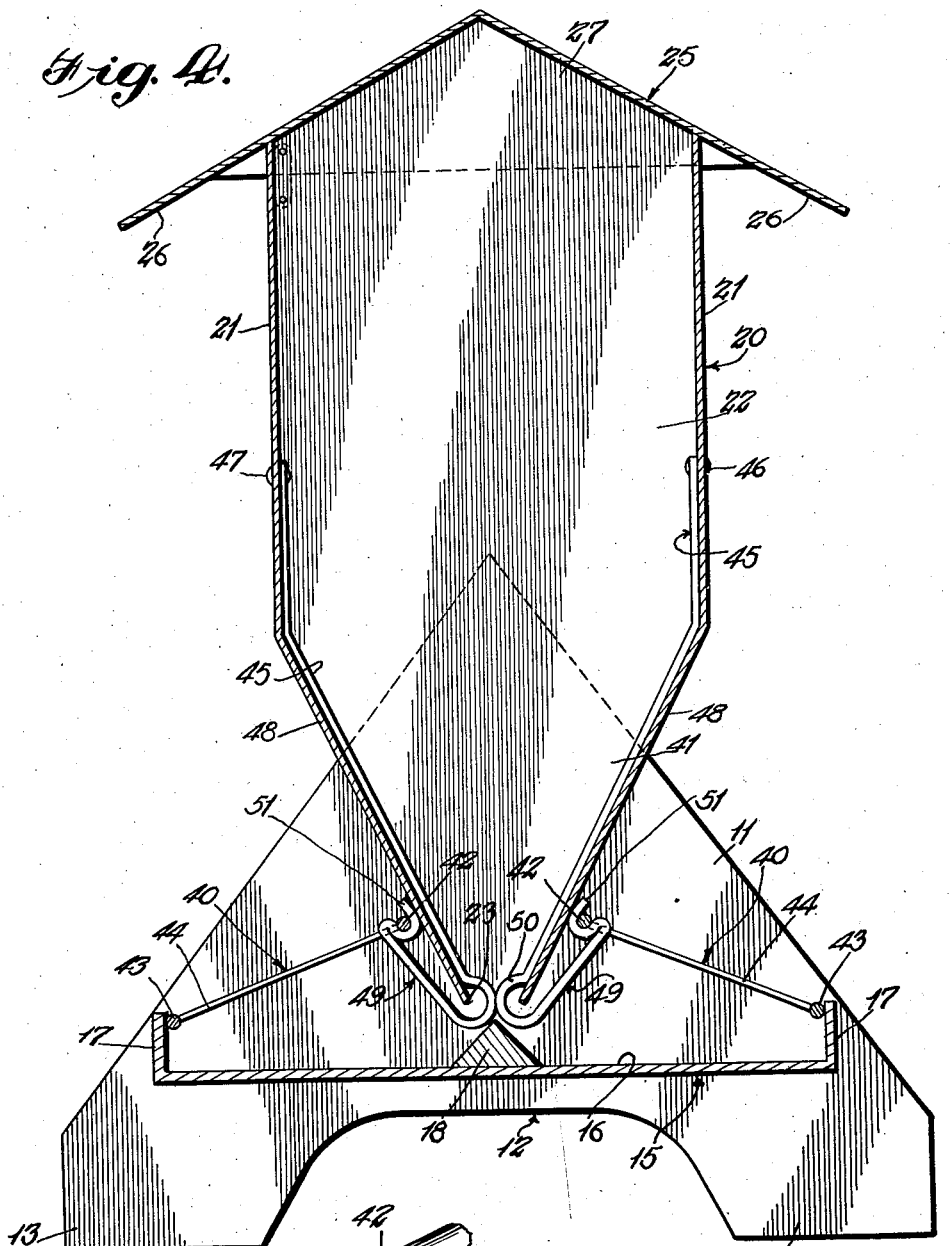
Fig. 4 is an enlarged transverse vertical section of the feeder.
Figure 5:
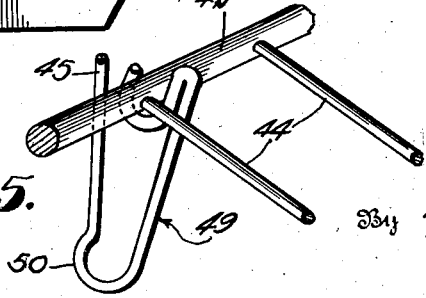
Fig. 5 is a fragmentary view in perspective showing a portion of the resilient supporting member for a screen.

A plurality of resilient wires 45 are secured to the inner face of side walls 21 of the hopper 20. These resilient wires extend downwardly as shown in Fig. 4 and contact with the walls 21 and then contact with the inclined side walls 48 of the hopper. The wires pass through the elongated slot 23 and then are bent in a U-shaped manner to provide an exteriorly disposed leg 49 in the trough 15. The bight portion 50 is curved where the resilient wire extends through the elongated opening. The extreme free end of each leg 49 is provided with a U-shaped seat 51 to receive the rod 42 of the screen 40. The U-shaped members 51 are formed on or suitably secured to the rods 42 in any approved manner. Thus, it will be seen that the screens 40 are resiliently supported by the spaced resilient wires 45 which extend downwardly through the hopper 20, then outwardly through the elongated opening 23 in the lower end of the hopper.

The feed is supplied to the hopper 20 by raising the roof 25 as shown in Fig. 2. Some of the feed will pass through the elongated opening 23 at the bottom of the hopper. The triangularly shaped bar 18 will cause the feed to be distributed at both sides of the bar to the trough 15 so that the poultry may feed at either side of the device.

The screens 40 through which the poultry may feed are resiliently supported above the trough 15, and when the poultry is feeding these screens are agitated causing the resilient wires to be agitated and the bight portions 50 on the wires 45 are also agitated within the narrow slot 23. The agitation of the bight portion and likewise the wires 45 within the hopper tends to maintain the fed in motion at the lower end of the hopper so that the feed will not clog in the reduced lower end thereof. The movement of the bight portions 50 in the narrow slot will cause the feed to be discharged into the trough so that sufficient feed will be discharged into the trough.

I claim:

1. A poultry feeder comprising a trough, a hopper having a narrow elongated opening in the bottom thereof, means supporting the hopper above the trough, a screen through which the heads of the poultry must pass to obtain the feed in the trough, and means supporting the inner end of the screen, said supporting means extending through the elongated opening and into the hopper and adapted to agitate the feed at the opening for aiding in discharging the feed from the hopper, said screen being agitated during feeding.

2. A poultry feeder comprising a trough, a hopper having a narrow elongated slot in the bottom thereof, means supporting the trough and hopper so that the slot will be located above the trough, a screen having feeding passages and movably mounted over the trough, and wires secured at one end to an inner wall of the hopper and projecting through the slot, the other ends of the wires being secured to one end of the screen so that during feeding the supporting wires will be agitated in the slot by the movable screen to cause the feed to be projected through the slot.

3. A poultry feeder comprising a trough, a hopper having a narrow elongated slot in the bottom thereof, means supporting the trough and hopper so that the slot will be located above the trough, a screen having feeding passages and movably mounted over the trough, and wires secured at one end to an inner wall of the hopper and provided with a U-shaped portion disposed in the slot, and means connecting the other ends of the wires to one edge of the screen, said screen being supported by the wires so that when the poultry is feeding the screen and the U-shaped portions will be agitated to cause the feed to be discharged through the slot.

4. A poultry feeder comprising a trough, a hopper having a narrow elongated slot in the bottom thereof, means supporting the trough and hopper relative to each other so that the slot will be located above the trough, a screen movably mounted in the trough, and resilient means supporting the screen above the bottom of the trough and adapted to be agitated when the poultry is feeding through the screen, a portion of the resilient supporting means extending through the slot and adapted to be agitated by the screen for causing the feed to be discharged through the slot.

5. A poultry feeder comprising a trough, a hopper having a narrow elongated slot in the bottom thereof, means supporting the trough and hopper relative to each other so that the slot will be located above the trough, a screen movably mounted in the trough, a roof hingedly mounted on the upper end of the hopper and having eaves extending over the trough to protect the same against the weather, and a resilient means projecting through the slot and connected to the screen for supporting the screen, said screen adapted to be agitated during feeding for agitating the resilient means to cause the feed to be discharged from the slot.

6. A poultry feeder comprising a trough, a hopper having a narrow elongated slot in the bottom thereof, means supporting the trough and hopper relative to each other so that the slot will be located above the trough, a screen movably mounted in the trough at each side of the slot, and spaced resilient means supported by each opposite wall of the hopper and projecting through the slot, the resilient means below the slot having upwardly disposed extensions, the extensions along one edge of the screen being connected to one screen, the other extensions being connected to the other screen, said resilient means where passing through the slot being adapted to be agitated by the screen during feeding.

7. A poultry feeder comprising a trough, a hopper having a narrow elongated slot in the bottom thereof, means supporting the trough and hopper relative to each other so that the slot will be located above the trough, a screen movably mounted in the trough, and spaced resilient wires having one end connected to an inner wall of the hopper, each wire having a U-shaped portion at its other end, the other free end of the wire being connected to the screen for resiliently supporting said screen, the bight of each U-shaped portion being disposed in the slot so that during feeding the screen and the bights will be agitated, and the agitation of the bights in the slot causing the feed to be discharged from said slot.

8. A poultry feeder comprising a trough, a hopper having a narrow elongated slot in the bottom thereof, means supporting the trough and hopper relative to each other so that the slot will be located above the trough, a screen movably mounted in the trough, and spaced resilient means projecting through the slot for movably supporting the screen through which the poultry must feed, movement of the screen causing agitation of the resilient means in the slot and the feed in the hopper whereby the feed will be discharged from said slot.

ROBERT T. PAYNE.